United States Patent [19]

Farr

[11] 4,437,483
[45] Mar. 20, 1984

[54] FLUID-PRESSURE-OPERABLE RELAY VALVES

[75] Inventor: Glyn P. R. Farr, Warwickshire, England

[73] Assignee: Lucas Industries Limited, Birmingham, England

[21] Appl. No.: 274,401

[22] Filed: Jun. 17, 1981

[30] Foreign Application Priority Data

Jun. 18, 1980 [GB] United Kingdom ............... 8019956

[51] Int. Cl.³ .................................... F16K 11/14
[52] U.S. Cl. .......................... 137/85; 137/627.5
[58] Field of Search ......................... 137/85, 627.5

[56] References Cited

U.S. PATENT DOCUMENTS

| 3,818,944 | 6/1974 | Taft | 137/627.5 |
| 3,833,272 | 9/1974 | Farr | 137/627.5 X |
| 4,096,884 | 6/1978 | Horowitz | 137/627.5 |
| 4,126,152 | 11/1978 | Kirk | 137/85 |

Primary Examiner—Robert G. Nilson
Attorney, Agent, or Firm—Scrivener, Clarke, Scrivener and Johnson

[57] ABSTRACT

In a fluid-pressure-operable relay valve a control piston works in a bore in the valve housing to control sequential communication between an inlet port and an outlet port, and between the outlet port and an exhaust port. An exhaust valve seating on the control piston is engageable with an exhaust valve member coupled to one end of a lever pivotally mounted in the housing, and a spring acts on the exhaust member to urge an inlet valve member towards an inlet seating surrounding the inlet port. Since the spring acts in opposition to fluid pressure at the inlet port, a relatively small 'cracking force' is required to the urge the inlet member away from the inlet seating to open the inlet valve.

In alternative constructions the inlet and exhaust members are combined into a single valve member which is urged directly by the spring towards the inlet seating.

12 Claims, 10 Drawing Figures

FLUID-PRESSURE-OPERABLE RELAY VALVES

This invention relates to fluid-pressure-operable valves of the kind comprising a housing having an inlet port, an outlet port, and an exhaust port, an inlet valve for controlling communication between the inlet port and the outlet port, an exhaust valve for controlling communication between the outlet port and the exhaust port, and a control member in the housing for controlling sequential operation of the valves in response to a control force on the control member.

In known valves of the kind set forth the valves are arranged concentrically within the housing and incorporate a tubular member, which is slidable within the housing and is common to both valves. The tubular member comprises the inlet valve member of the inlet valve which is engagable with an inlet seating in the housing and the tubular member carries an exhaust seating for the exhaust valve with which an exhaust valve head carried by the control member is engagable before the valve member can be moved away from the inlet seating.

In such known valves a relatively high cracking force is required to urge the valve member away from the inlet seating since this force has to overcome the pressure at the inlet port, which acts on the inlet valve member in a direction to hold the inlet valve closed, the friction of a sliding seal between the valve member and the housing, and the load in a spring for urging the valve member into engagement with the inlet seating in order to overcome the friction of the seal, which might otherwise prevent the inlet valve from closing, and augment the closing effect of the pressure at the inlet port. In addition because that seal is subjected at all times to a substantial pressure differential, the hysteresis generated by the sliding seal may cause a problem.

According to our invention in a fluid-pressure-operable valve of the kind set forth the inlet valve comprises an inlet valve member which is engagable with an inlet seating surrounding the inlet port, and a spring co-operates with the valve member to urge it towards the seating in opposition to the effect of fluid pressure at the inlet port.

Thus, in contrast to known fluid-pressure-operable valves of the kind set forth in which the spring acts in the same direction as the force of the fluid pressure at the inlet port, in our invention the spring acts in opposition thereto. This has the advantage that only a relatively small cracking force is required to urge the inlet valve member away from the inlet seating, namely a force sufficient to overcome the difference between the load in the spring and the force of the fluid pressure at the inlet port acting on the inlet valve member over the area of the inlet seating. Also the sliding seal subjected to constant pressure is eliminated.

The inlet valve member may be urged directly towards the inlet seating by the spring, or the spring may act on the valve member through a lever which is pivotally mounted in the housing.

When the control member comprises a piston of substantial diameter working in a bore in the housing, the cracking force is applied to one face of the piston and the opposite face is exposed to the pressure at the inlet port when the inlet valve opens. With the exhaust valve open, and the inlet valve closed however, any sliding seal between the piston and the bore will be subjected to a zero pressure differential, so that the hysteresis generated by the sliding seal is substantially of no consequence in opposing the cracking force.

The cracking force may be generated by a fluid control pressure, suitably a pneumatic pressure, acting over the said one face of the control piston. Alternatively the control pressure may be hydraulic and be applied to an hydraulic piston which may engage directly with the said one face of the control piston.

The exhaust valve may comprise an exhaust valve face on an exhaust member which is movable with respect to a seating on the control member. The exhaust member may be separate from the inlet member but movable in sequence therewith, conveniently by means of a lever.

Alternatively the exhaust member may be integral with the inlet member, conveniently with the spring acting on it to urge the inlet member towards the inlet seating.

When the inlet member and the exhaust members are combined into a single component, the single component may be rigid and be slidably guided through a clearance bore in the control member.

Alternatively the component may be disposed between the inlet seating and the control member, comprising a flexible element which is adapted to deform when the inlet valve opens.

Some embodiments of our invention as illustrated in the accompanying drawings in which.

Figure 1:
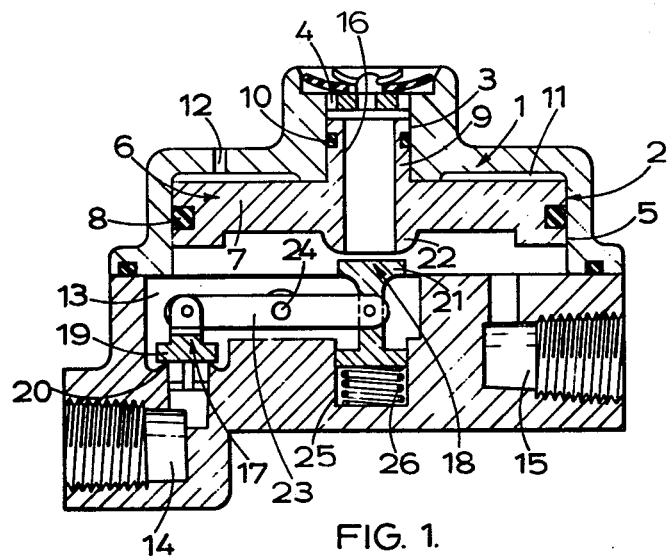
FIG. 1 is a longitudinal section through a pneumatically-operable relay valve.

The pneumatically-operable relay valve illustrated in FIG. 1 of the drawings comprises a housing 1 having a stepped bore 2. The bore 2 comprises an outer bore portion 3 of smaller diameter lending to exhaust ports 4, and an inner bore portion 5 of substantial diameter.

A control piston 6 of differential outline works in the bore 2. The piston 6 comprises a portion 7 of greater diameter which carries a seal 8 slidably guided in the bore portion 5, and a spigot portion 9 which carries a seal 10 slidably guided in the bore portion 3.

A control chamber 11 defined by a space in the housing 1 between the seals 8 and 10 and the bore portions 3 and 5 with which they engage is supplied with a pneumatic control pressure through a control port 12 in the wall of the housing 1.

A transfer chamber 13 defined in the housing 1 at the end of the piston 6 opposite the control chamber 11 provides sequential communication between an inlet port 14, for connection to a source of pneumatic inlet pressure, and an outlet port 15 for connection to a vehicle brake actuator, and between the outlet port 15 and the exhaust port 4 through a bore 16 in the spigot portion 9.

Communication between the inlet port 14 and the transfer chamber 13 is controlled by an inlet valve 17, and between the transfer chamber 13 and the exhaust port 4 by an exhaust valve 18.

The inlet valve 17 comprises a valve member 19 for engagement with a seating 20 surrounding the inner end of the inlet port 14, and the exhaust valve 18 comprises a valve member 21 for engagement with a seating 22 surrounding the inner end of the spigot portion 9. The valve members 19 and 21 are coupled to opposite ends of a lever 23 which is pivotally connected at an intermediate point in its length to a fulcrum 24 in the housing 1, and the valve member 21 is guided to slide in a blind bore 25 in the housing 1. A compression spring 26 acts between the closed end of the bore 25 and the valve member 21, and through the lever 23, to urge the valve member 19 into engagement with the seating 20 to isolate the inlet port 14 from the transfer chamber 13. In this position the exhaust valve member 21 is spaced from the seating 22 so that the outlet port is in communication with the exhaust port 4 through the bore 16.

The strength of the spring 26 is chosen to hold the inlet valve member 19 in engagement with the seating against the pressure at the inlet port 14. The load in the spring 26 is therefore slightly greater than a force equal to the inlet pressure acting on the inlet valve member 19 over the area of the seating 20.

In an inoperative position, as shown in the drawing, the inlet valve 17 is closed and the exhaust valve 18 is open. No pressure is present in the control chamber 11 so that the seals 8 and 10 are subjected to a zero pressure differential.

When the control pressure is applied to the control chamber 11, suitably from a treadle valve, the piston 6 is advanced in the bore 5, initially to cause the seating 22 to engage with the valve member 21, thereby closing the exhaust valve 18, and thereafter moving the valve member 21 axially against the loading in the spring 26 which causes the lever 23 to move angularly and open the inlet valve 17. Fluid under pressure from the inlet port 14 is then supplied to the output port 15 through the transfer chamber 13. This pressure also acts on the adjacent face of the piston 6 to provide a reaction force to the control pressure in the chamber 11. As that reaction force increases, the piston 6 is urged upwardly to permit the inlet valve 17 to close. The relay valve is then in a "lapped" condition in which both the inlet valve 17 and the exhaust valve 18 are closed.

If the control pressure is reduced, the piston 6 is urged upwardly by the pressure through a further distance sufficient to enable the exhaust valve to open so that air at the outlet port 15 and in the transfer chamber 13 can be exhausted to atmosphere through the bore 16 and the exhaust port 4.

Figure 2:
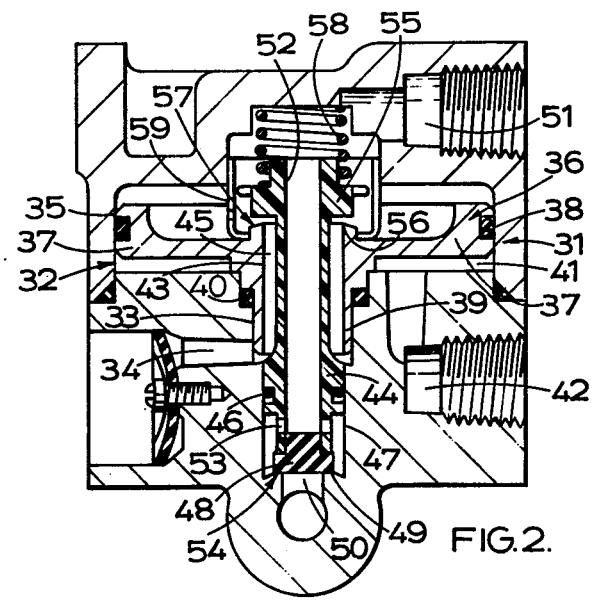
FIG. 2 is a longitudinal section through another pneumatically-operable relay valve.

The pneumatically-operable relay valve illustrated in FIG. 2 of the drawings comprises a housing 31 having an internal stepped bore 32. The bore 32 comprises a stepped bore portion 33 of smaller diameter leading to an exhaust port 34, and a bore portion 35 of substantial diameter.

A control piston 36 of differential outline works in the bore 32. The piston 36 comprises a portion 37 of greater diameter which carries a seal 38 slidably guided in the bore portion 35, and a spigot portion 39 which is of stepped outline and works in the bore portion 33. A seal 40 is disposed between complementary shoulders on the spigot portion 39 and in the bore portion 33.

A control chamber 41 defined by a space in the housing between the seals 38 and 40 and the bore portions 33 and 35 with which they engage is supplied with a pneumatic control pressure through a control port 42 in the wall of the housing 31.

The spigot portion 39 has a through bore 43 through which a valve member 44 extends with a substantial annular clearance passage 45 being provided between the valve member 44 and the bore 43. A portion of the valve member 44 adjacent to the free end of the spigot portion 39 carries a rolling 'O' ring seal 46 which seals in a bore 47 in the housing 31. At that end the valve member 44 is also provided with an inlet valve head 48 for engagement with a seating 49 surrounding an inlet port 50 from a reservoir for pneumatic fluid under pressure. A region of the bore 47 between the seal 46 and the seating 49 communicates with an outlet port 51 at the opposite end of the housing for connection to a brake, through a longitudinal bore 52 and radial ports 53 in the valve member 44.

The head 48 and the seating 49 constitute an inlet valve 54.

The opposite end of the valve member 44 remote from the head 48 carries an enlarged head 55 which is normally spaced from a seating 56 at the adjacent end of the spigot portion 39 with which it forms an exhaust valve 57. In this position the outlet port 51 is connected to the exhaust port 34 through the clearance passage 45.

In the inoperative position shown in the drawing, with zero pressure in the control chamber 41, the inlet valve 54 is closed with the head 48 urged into engagement with the seating 49 by means of a spring 58 acting on the head 55 and of a strength just sufficient to exceed an opening force equal to the pressure in the reservoir acting on the head 48 over the area of the seating 49.

When the control pressure is applied to the control chamber, suitably from a treadle valve, the piston 36 is moved upwardly, initially to cause the seating 56 to engage with the head 55. This closes the exhaust valve 57. Thereafter the valve member 44 is moved axially against the loading in the spring 58 to urge the head 48 away from the seating 49 and open the inlet valve. Fluid under pressure is then supplied from the inlet port 50 to the outlet port 51 through the passages 53 and the bore 52 in the valve member 44. This fluid pressure also acts on the adjacent face of the piston portion 37 to provide reaction force to the control pressure in the chamber 41. As that reaction force increases, the piston 36 is urged downwardly to permit the inlet valve 54 to close. The relay valve is then in a "lapped" condition in which both the inlet valve 54 and the exhaust valve 57 are closed.

Reduction in the control pressure permits the exhaust valve 57 to open and exhaust the fluid at the outlet port 51 to atmosphere through the clearance passage 45 and the exhaust port 34.

The seal 46 is pressure balanced during the opening stage of the inlet valve 54. The 'O' ring seal 46 is of circular cross-section and its groove is wider than the thickness of the seal which will tend to roll without friction until a reasonable pressure differential has been established. Since the required movement of the head 48 away from the seating 49 is likely only to be small, once the seal 46 ceases to roll, any further opening movement of the inlet valve 54 can be accommodated by flexure of the seal 46, rather than by sliding thus ensuring low hysteresis.

In the relay valve illustrated in FIG. 2 an apertured damping plate 59 surrounds the head 55 and the seating 56. This slides with the piston 37 which is thus stabilised against rapid pressure fluctuations which can occur when the inlet valve 54 first opens.

Figure 3:
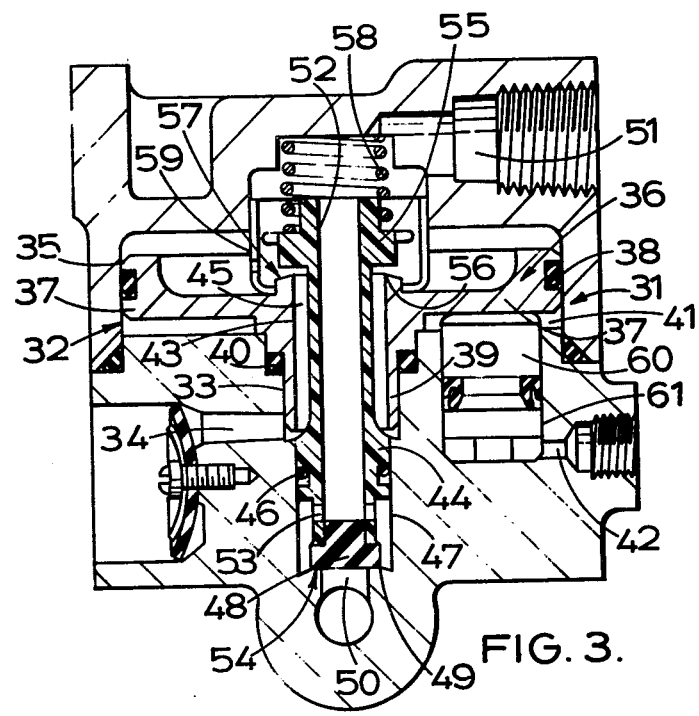
FIG. 3 is a longitudinal section through a valve similar to that of FIG. 2 but adapted for hydraulic operation.

In the relay valve illustrated in FIG. 3 of the drawings the treadle valve is replaced by a pedal-operated hydraulic master cylinder and one or more pistons 60 working in hydraulic bores 61 connected to the master cylinder act directly on the stepped piston 36 to advance it in the bore 32 in response to hydraulic pressure from the master cylinder.

The construction and operation of the relay valve of FIG. 3 is otherwise the same as that of FIG. 2 and corresponding reference numerals have been applied to corresponding parts.

Figure 4:
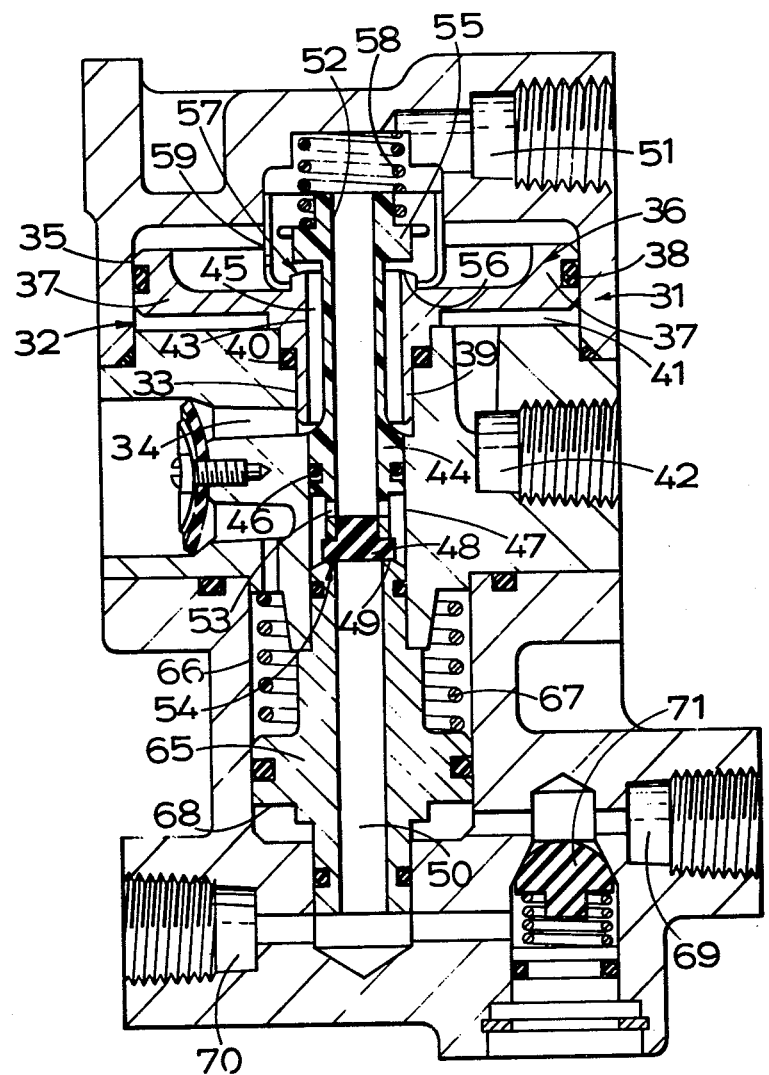
FIG. 4 is a longitudinal section through a valve similar to the valve of FIG. 2 but incorporating a modification.

The relay valve illustrated in FIG. 4 of the drawings is adapted to apply the brake on a trailer from the outlet port 51.

In this relay valve the seating 49 for the inlet valve 54 is provided on the inner end of a differential piston 65 which works in a stepped bore 66 in the housing 31, with the port 50 comprising longitudinal bore in the piston 65. A spring 67 acts on the piston 65 in a direction tending to urge it away from the valve member 44 in opposition to fluid pressure from a tractor mounted main reservoir which is applied to a face 68 at the lower end of the piston 65 through an inlet passage 69. The passage 69 communicates with a passage 70 which leads to a secondary reservoir for the trailer through a one-way valve 71, and the passage 70 is in direct communication with the bore 50 in the piston 65.

When the main reservoir is operative the piston 65 is held in the advanced position shown in the drawing against the load in the spring 67 by the pressure acting on the face 68. In the event of failure of the main reservoir, for example upon separation in transit of the trailer from the tractor, the spring 67 acts to urge the piston 65 relatively away from the valve member 44 so that, after the exhaust valve 57 has closed, the trailer brake can then be applied by the supply of fluid from the trailer reservoir to the outlet 51 through the then open inlet valve 54.

This ensures that the trailer brakes can be applied automatically in the event of separation of the trailer from the tractor.

The construction and operation of the relay valve of FIG. 4 is otherwise the same as that of FIG. 2 and corresponding reference numerals have been applied to corresponding parts.

Figure 5:
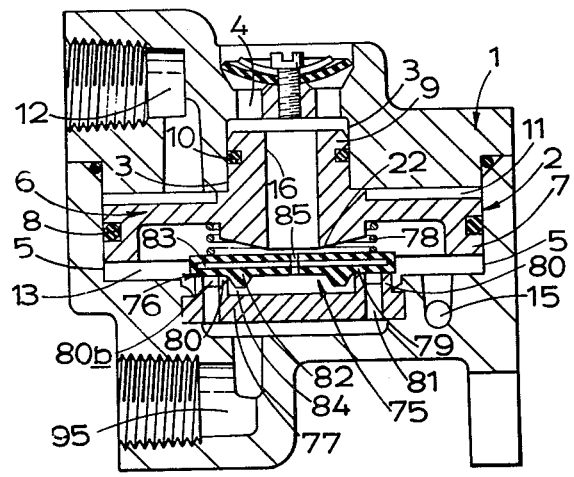
FIG. 5 is a longitudinal section through another pneumatically-operable relay valve.

The relay valve illustrated in FIG. 5 of the drawings is similar to that described above with reference to FIG. 1 and corresponding reference numeral have been applied to corresponding parts. In this construction, however, the lever 23 is omitted and the separate inlet and outlet valves 17 and 18 are replaced by a combined valve assembly 75 located within the transfer chamber 13.

As illustrated the valve assembly 75 comprises a common valve member 76 for engagement with a seating member 77, and a compression spring 78 acting between the piston 6 and the valve member 76 to urge the valve member 76 into engagement with the seating. The valve member 76 comprises a disc 79 of elastomeric material for engagement adjacent to its peripheral edge with inner and outer concentric seatings 80 around a groove 80b in communication by way of a series of angularly spaced inlet ports 81 with a passage 95 for connection to a source of inlet pressure. The disc 79 has an annular rib 82 lying within the inner seating 80 but normally spaced from the adjacent face of the seating member 77. A flexible metal member, conveniently in the form of a disc 83, is embedded in the elastomeric material. Normally the disc 83 is in a flat unstressed condition so that the valve member 76 engages both seatings to isolate the supply port 14 from the transfer chamber 13.

When the control pressure is applied to the control chamber 11 from the treadle valve the piston 6 is advanced in the bore 2 against the loading in the spring 78 to cause the seating 22 to engage with the disc 79. This isolates the transfer chamber 13 from the exhaust port 4. Further movement of the piston 6 in the same direction causes the disc 79 to cone or otherwise deform about the inner seating 80 as a fulcrum. This lifts the disc 79 from engagement with the outer seating so that fluid from the passage 95 can be supplied to the outlet port 15 through the transfer chamber 13.

As the reaction on the piston 6, due to the pressure applied to the brake, increases the piston 6 is moved in the opposite direction to permit the disc 79 again to engage with the outer seating 80, due to the effect of the member 83 which straightens, thereby placing the relay valve in the lapped condition.

When the control pressure is reduced, the piston 6 is urged upwardly to move the seating 22 out of engagement with the disc 79 thereby exhausting the transfer chamber 13 to atmosphere.

A chamber 84 between the disc 79 and the seating member 77 is exhausted, to the exhaust port 4 when the seating 22 is in engagement with the disk 79 by means of a central vent passage 85 passing through the disc 79.

Figure 6:
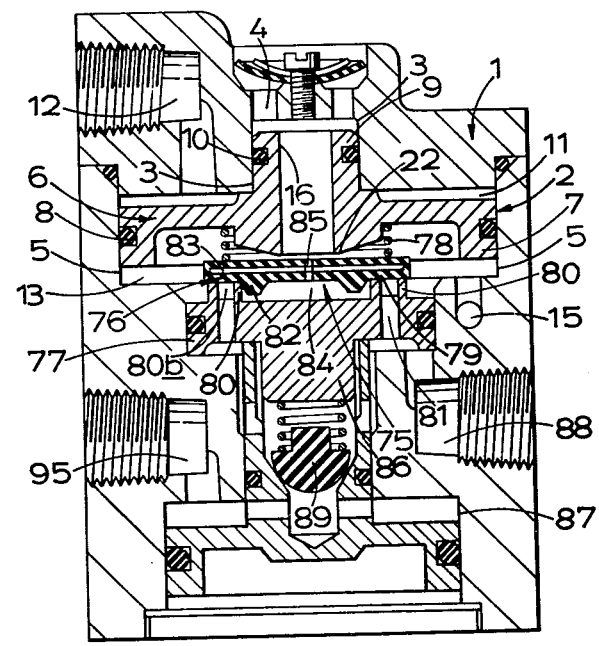
FIG. 6 is a longitudinal section through a valve similar to FIG. 5 but incorporating a modification.

The relay valve illustrated in FIG. 6 of the drawings is adapted to apply the brake of a trailer from the outlet port 15.

In this relay valve the seating member 77 comprises a differential piston 86 which works in a stepped bore 87 in the housing 1. The passage 95 is connected to a tractor mounted main reservoir and is in communication with a second port 88 connected to a secondary reservoir on the trailer through a one-way valve 89 and through which the pressure in the main reservoir acts on the piston 86 which consists of two parts screwed together. The lower part of the piston 86 which slides in the bore 87 is larger than the upper part which constitutes the seating 77. Therefore there is a net force in a downward direction.

When the brake is applied normally, fluid pressure from the trailer reservoir is supplied to the outlet port 15. However, in the event of failure of the main reservoir, such as by separation of the trailer from the tractor, the pressure on the larger part of the piston 86 disappears and the piston 86 is advanced in its bore by the pressure in the trailer reservoir to apply the trailer brakes automatically.

When the system is repaired and reconnected the main pressure must build up to a point where the pressure on the lower part of the piston 86 exceeds the force of the trailer reservoir pressure acting on the upper part of the piston 86 before the piston 86 moves down to exhaust the trailer brakes. At a higher pressure the one-way valve 89 opens to allow the trailer reservoir to be re-charged if necessary.

The construction and operation of the valve of FIG. 6 is otherwise the same as FIG. 5 and corresponding reference numerals have been applied to corresponding parts.

Figure 7:
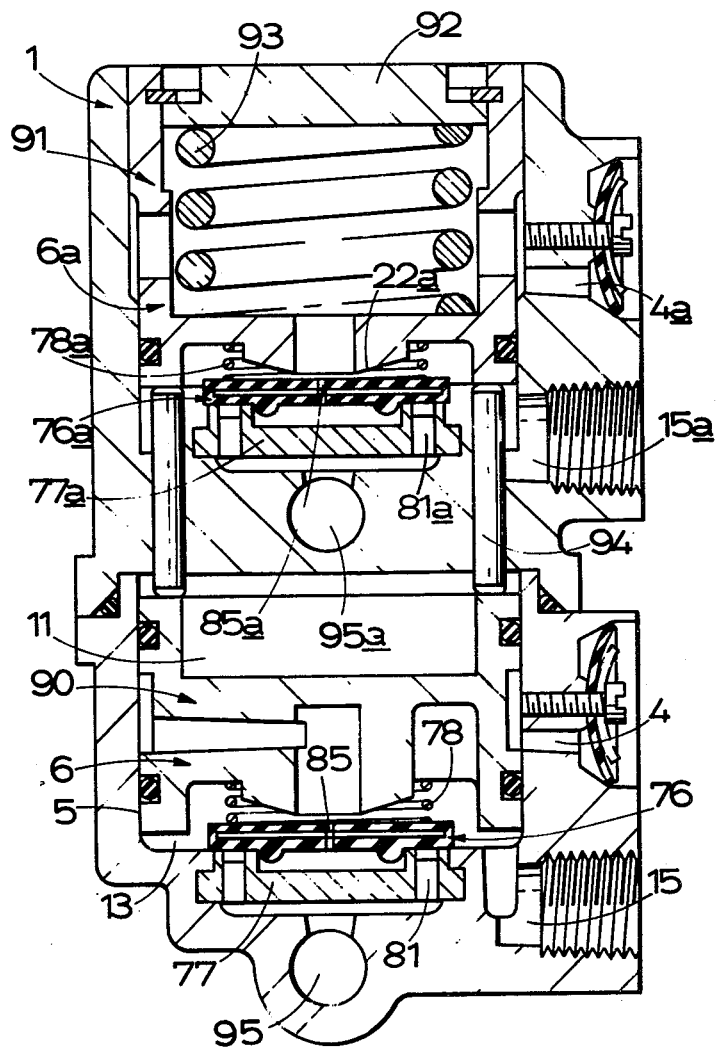
FIG. 7 is a longitudinal section through another valve similar to FIG. 5 but incorporating a modification.

In the valve assembly illustrated in FIG. 7 of the drawings two valves 90, 91, each substantially as described above with reference to FIG. 5, are embodied in the housing 1. The valves 90 and 91 are adapted to control two independent brake circuits from two independent supplies.

The lowermost valve 90 is identical in construction and operation to that of FIG. 6 and the uppermost valve 91 is similar except that the piston 6 is operated in response to a pedal force which acts on the piston 6 through a platform 92 and a feel spring 93.

Normally both valves are operated simultaneously with the valve 91 being operated mechanically from the platform 92 and the valve 90 being operated pneumatically by the control pressure in the control chamber 11 which is supplied to the chamber 11 through an axial passage (not shown) which connects the chamber below the piston 6a to the chamber 11.

In the event of failure of the control pressure, the valve 90 is to be operated by the valve 91, with the piston 6a acting on the piston 6 through a plurality of thrust transmitting members 94.

Reference numerals corresponding to the main parts of FIG. 5 have been added to the valve 90, and similar reference numerals, qualified by the suffix a have been added to the valve 91.

Figure 8:
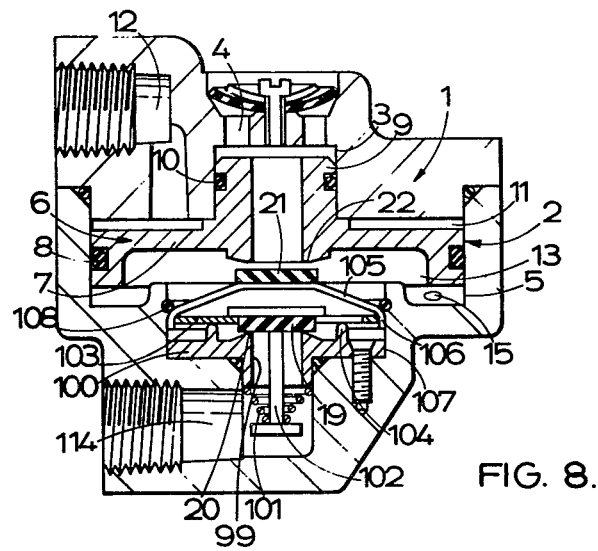
FIG. 8 is a longitudinal section through another pneumatically-operable relay valve.

The relay valve illustrated in FIG. 8 of the drawings is similar to that described above with reference to FIG. 1 and corresponding reference numerals have been applied to corresponding parts. In this construction however the lever 23 is omitted.

The inlet valve member 19 is urged into engagement with the seating 20 which surrounds an inlet port comprising a bore 99 in a seating member 100 which is co-axial with the bore 5 by means of a compression spring 101 which acts between the lower end of the seating member 100 and the head on a stem 102 which depends from the valve member 19. The bore 99 is connected to a passage 114 for connection to a reservoir for pneumatic fluid under pressure. Also the valve member 19 is carried by a radially slotted lever 103 of the diaphragm type which is adapted to pivot about an annular fulcrum 104 which surrounds the seating 20.

The exhaust valve member 21 is carried by an apertured pressing 105 of inverted dished outline of which the rim 106 is slidably guided in a bore 107 in the housing 1 and surrounds the peripheral edge of the lever 103. Movement of the pressing 105 towards the piston 6 is prevented by a circlip 108.

After the seating 22 has engaged with the exhaust valve member 21, further movement of the piston 6 in the same direction moves the pressing 105 axially in the bore 107, causing the lever 103 to pivot or otherwise cone about the fulcrum 104 thereby lifting the inlet valve member 19 away from the seating 20 against the force of the spring 101.

The construction and operation of the relay valve of FIG. 8 is otherwise the same as that of FIG. 1 and corresponding reference numerals have been applied to corresponding parts.

Figure 9:
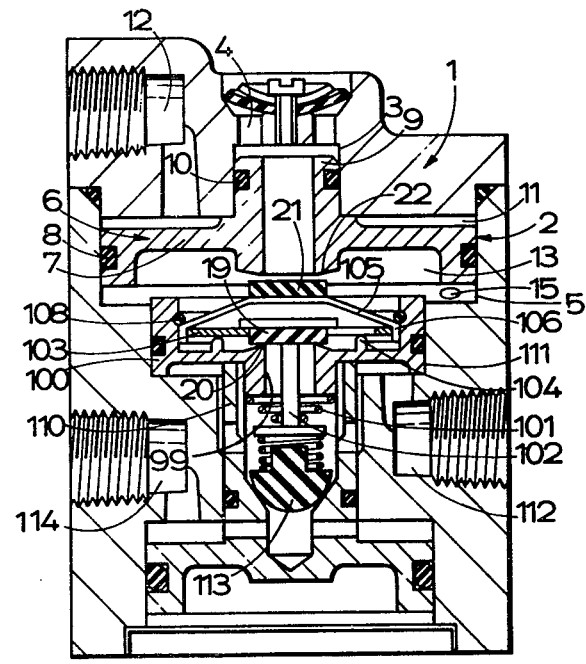
FIG. 9 is a longitudinal section through a valve similar to FIG. 8 but showing a modification.

The relay valve of FIG. 9 is adapted to apply the brake of a trailer from the outlet port 15.

In this relay valve the seating member 100 comprises a piston 110 which works in a bore 111 in the housing 1.

The passage 114 is connected to a main reservoir and is in communication with a second port 112 connected to a secondary reservoir on the trailer through a one-way valve 113 and through which the pressure in the main reservoir acts on the piston 110.

When the brake is applied normally, fluid pressure from the trailer reservoir is supplied to the outlet port 15. However, in the event of failure of the main reservoir, such as by separation of the trailer from the tractor, the piston 110 is advanced in its bore by the pressure in the trailer reservoir to apply the trailer brakes automatically.

The construction and operation of the valve of FIG. 9 is otherwise the same as FIG. 8 and corresponding reference numerals have been applied to corresponding parts.

Figure 10:
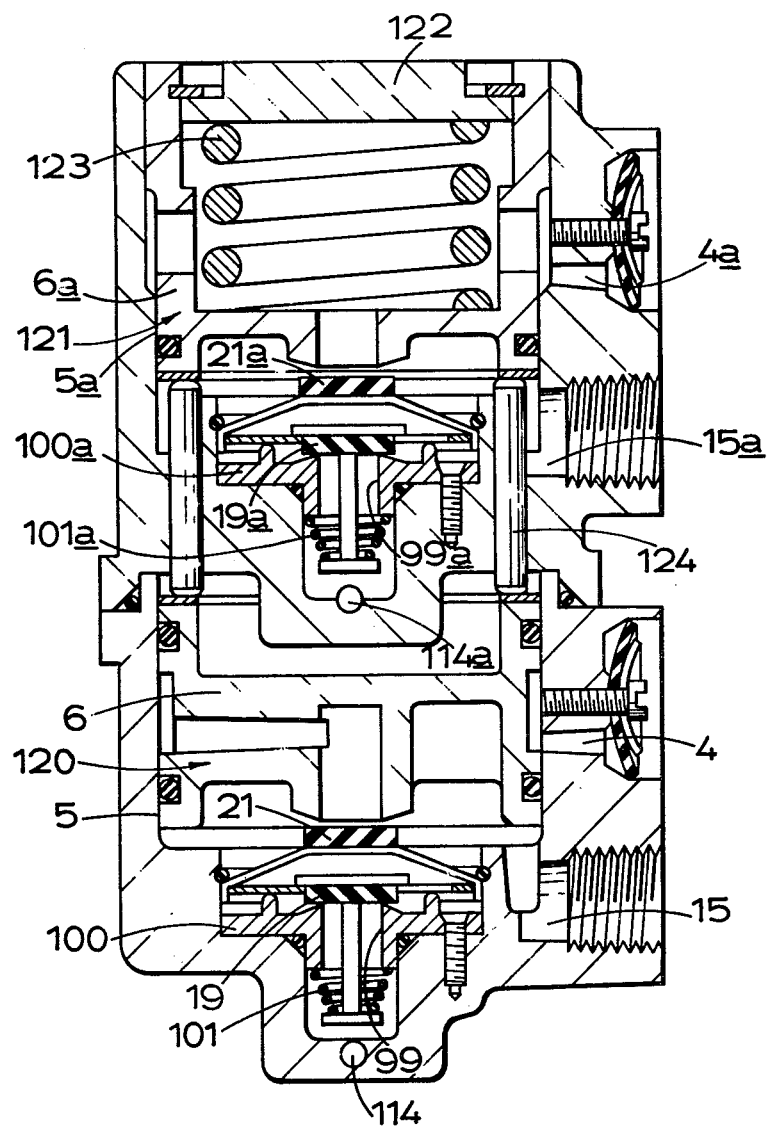
FIG. 10 is a longitudinal section through another valve similar to FIG. 8 but incorporating a modification.

In the valve assembly illustrated in FIG. 10 of the drawings two valves 120, 121 each substantially as described above with reference to FIG. 8 are embodied in the housing 1. The valve 120, 121 are adapted to control two independent brake circuits from two independent supplies.

The lowermost relay valve 120 is identical in construction and operation to that of FIG. 8 and the uppermost valve 121 is similar except that the piston 6 is operated in response to a pedal force which acts on the piston 6 through a platform 122 and a feel spring 123.

Normally both valves are operated simultaneously with the valve 121 being operated mechanically from the platform 122 and the valve 120 being operated penumatically by the control pressure in the control chamber 11 which is supplied to the chamber 11 through an axial passage (not shown) which connects the chamber below the piston 6a to the chamber 11.

In the event of failure of the control pressure, the valve 120 is to be operated by the valve 121, with the piston 6a acting on the piston 6 through a plurality of thrust transmitting members 124.

Reference numerals corresponding to the main parts of FIG. 8 have been added to the valve 120, and similar reference numerals, qualified by the suffix a have been added to the valve 121.

I claim:

1. A fluid-pressure-operable valve comprising a housing having an inlet port, an outlet port, and an exhaust port, an inlet valve for controlling communication between said inlet port and said outlet port, an exhaust valve for controlling communication between said outlet port and said exhaust port, a control member in the housing for controlling sequential operation of said valves in response to a control force on said control member, said inlet valve comprising an inlet valve member and an inlet seating which surrounds said inlet port, said inlet valve member being engageable with said inlet seating, and a spring for urging said inlet valve member towards said inlet seating in opposition to the effect of fluid pressure at said inlet port, said exhaust valve comprising an exhaust valve member and an exhaust seating provided on said control member, said exhaust valve member having an exhaust valve face which is engageable with said exhaust seating, said exhaust valve member being relatively movable with respect to said control member, and said inlet and exhaust valve members comprising a single integral valve component.

2. A fluid-pressure-operable valve as claimed in claim 1, wherein said spring urges said inlet valve member directly towards said inlet seating.

3. A fluid-pressure-operable valve as claimed in claim 1, wherein said housing is provided with a bore, and said control member comprises a piston of substantial diameter working in said housing, said piston having one face to which said control force is applied, and an opposite face which is exposed to said pressure at said inlet port when said inlet valve opens.

4. A fluid-pressure-operable valve as claimed in claim 3, wherein said control force is generated by a fluid control pressure acting over the said one face of said control piston.

5. A fluid-pressure-operable valve as claimed in claim 3, wherein an hydraulic piston is directly engageable with the said one face of said control piston, and said control force is generated by an hydraulic control pressure applied to said hydraulic piston.

6. A fluid-pressure-operable valve as claimed in claim 1, wherein said control member is provided with a clearance bore and said single valve component comprises a rigid valve member which is slidably guided in said clearance bore.

7. A fluid-pressure-operable valve as claimed in claim 6, wherein said valve member is provided at one end with an inlet valve head for engagement with said inlet seating and at the opposite end with an enlarged head for engagement with said exhaust seating on said control member, said spring acting on said enlarged head to urge said inlet valve head towards said inlet seating.

8. A fluid-pressure-operable valve as claimed in claim 1, wherein said single valve component comprises a flexible valve member which is disposed between said inlet seating and said control member, and is adapted to deform when said inlet valve opens.

9. A fluid-pressure-operable valve as claimed in claim 8, wherein said inlet seating comprises inner and outer concentric seatings surrounding said inlet port, and said valve member comprises a disc of elastomeric material and a flexible metal member embedded therein, said disc having one face which is engageable with said inner and outer seatings and an opposite face which is engageable with said exhaust seating on said control member, said spring acting between said control member and said opposite face to urge said one face into engagement with said inner and outer seatings, and movement of said control member in response to said control force causing said exhaust seating to engage with said opposite face and subsequently causing said disc to cone about said inner seating to open said inlet valve.

10. A fluid-pressure-operable valve for controlling the supply of pressure fluid to a brake comprising a housing having an inlet port, an outlet port for connection to said brake, an exhaust port, and a stepped bore, an inlet valve for controlling communication between said inlet port and said outlet port, an exhaust valve for controlling communication between said outlet port and said exhaust port, a control member in the housing for controlling sequential operation of said valves in response to a control force on said control member, said inlet valve comprising an inlet valve member and a seating member upon which is provided an inlet seating which surrounds said inlet port, said inlet valve member being engageable with said inlet seating, a spring for urging said inlet valve member towards said inlet seating in opposition to the effect of fluid pressure at said inlet port, said exhaust valve comprising an exhaust valve member and an exhaust seating provided on said control member, said exhaust valve member having an exhaust valve face which is engageable with said exhaust seating, said exhaust valve member being relatively movable with respect to said control member, said inlet and exhaust valve members comprising a single integral valve component, an inlet passage for connection to a main reservoir for fluid under pressure, a second passage for connection to a secondary reservoir, said inlet port being in direct communication with said second passage, and a one-way valve through which said inlet passage is in communication with said inlet port and said second passage, said seating member comprising a differential piston which works in said stepped bore in said housing, and the valve being so constructed and arranged that, upon failure of said main reservoir, said seating member is adapted to move in such a direction to sequentially operate said inlet and exhaust valves to cause fluid pressure from said secondary reservoir to be supplied through said outlet port to said brake.

11. A valve assembly comprising a housing having a fluid-pressure-operable first valve for controlling the supply of pressure fluid to a first brake circuit from a first supply and a pedal-operable second valve for controlling the supply of pressure fluid to a second brake circuit from a second supply, said first and second valves each comprising an inlet port, an outlet port, an exhaust port, an inlet valve for controlling communication between said inlet port and said outlet port, an exhaust valve for controlling communication between said outlet port and said exhaust port, a control member in the housing for controlling operation of said inlet and exhaust valves in response to a control force on said control member, said inlet valve comprising an inlet valve member and an inlet seating which surrounds said inlet port, said inlet valve member being engageable with said inlet seating, and a spring for urging said valve member towards said inlet seating in opposition to the effect of fluid pressure at said inlet port, said exhaust valve comprising an exhaust valve member and an exhaust seating provided on said control member, said exhaust valve member having an exhaust valve face which is engageable with said exhaust seating, said exhaust valve member being relatively movable with respect to said control member, said inlet and exhaust valve members comprising a single integral valve component, said control member of said second valve being operable in response to a pedal force, and said control member of said first valve being operable in response to a fluid control pressure, and, upon failure of said control pressure being operable by said control member of said second valve.

12. A valve assembly as claimed in claim 11, wherein at least one force transmitting member is provided between said control members of said first and second valves and through which said control member of said second valve acts on said control member of said first valve upon failure of said control pressure.

* * * * *